United States Patent
Fukushima

[11] Patent Number: 5,844,710
[45] Date of Patent: Dec. 1, 1998

[54] FARADAY ROTATOR AND OPTICAL DEVICE EMPLOYING THE SAME

[75] Inventor: Nobuhiro Fukushima, Kawasaki, Japan

[73] Assignee: Fujitsu Limited, Kawasaki, Japan

[21] Appl. No.: 803,378

[22] Filed: Feb. 20, 1997

[30] Foreign Application Priority Data

Sep. 18, 1996 [JP] Japan .................................. 8-245952

[51] Int. Cl.$^6$ ....................................................... G02F 1/09
[52] U.S. Cl. ............................................ 359/283; 359/251
[58] Field of Search ................................. 359/280, 281, 359/282, 283, 284, 251, 324

[56] References Cited

U.S. PATENT DOCUMENTS

| | | | |
|---|---|---|---|
| 3,376,157 | 4/1968 | Guerici et al. | 359/324 |
| 3,407,364 | 10/1968 | Turner . | |
| 3,411,840 | 11/1968 | Robinson | 359/282 |
| 3,527,577 | 9/1970 | Fan et al. . | |
| 3,558,214 | 1/1971 | DeLang et al. | 359/282 |
| 3,700,307 | 10/1972 | Glenn | 350/157 |
| 4,305,046 | 12/1981 | Le Floch et al. | 331/94.5 C |
| 4,387,953 | 6/1983 | Shirasaki et al. | 530/96.14 |
| 4,548,478 | 10/1985 | Shirasaki | 350/377 |
| 4,581,579 | 4/1986 | Nagatsuma et al. | 324/244 |
| 4,609,254 | 9/1986 | Shirasaki | 350/376 |
| 4,637,027 | 1/1987 | Shirasaki et al. | 372/27 |
| 4,650,289 | 3/1987 | Kuwahara | 350/375 |
| 4,668,052 | 5/1987 | Shirasaki | 350/377 |
| 4,678,287 | 7/1987 | Buhrer | 350/404 |
| 4,818,881 | 4/1989 | Tanton et al. | 250/338.1 |
| 4,933,629 | 6/1990 | Kozuka et al. | 324/96 |
| 4,973,120 | 11/1990 | Jopson et al. | 350/96.13 |
| 4,984,875 | 1/1991 | Abe et al. | 350/377 |
| 4,988,170 | 1/1991 | Buhrer | 350/377 |
| 5,029,953 | 7/1991 | Dexter et al. | 350/1.1 |
| 5,033,830 | 7/1991 | Jameson | 350/403 |
| 5,050,968 | 9/1991 | Ohara | 359/281 |
| 5,052,786 | 10/1991 | Schulz | 359/484 |
| 5,212,446 | 5/1993 | Itoh et al. | 324/244.1 |
| 5,267,078 | 11/1993 | Shiraishi et al. | 359/282 |
| 5,345,329 | 9/1994 | Shirai et al. | 359/283 |
| 5,521,741 | 5/1996 | Umezawa et al. | 359/246 |
| 5,528,415 | 6/1996 | Gauthier et al. | 359/282 |

FOREIGN PATENT DOCUMENTS

| | | |
|---|---|---|
| 56-94326 | of 1981 | Japan . |
| 57-68818 | 4/1982 | Japan . |
| 57-94715 | 6/1982 | Japan . |
| 57-168221 | 10/1982 | Japan . |
| 57-188014 | 11/1982 | Japan . |
| 58-49916 | 3/1983 | Japan . |
| 59-121313 | 7/1984 | Japan . |
| 59-121314 | 7/1984 | Japan . |
| 60-131523 | 7/1985 | Japan . |

(List continued on next page.)

OTHER PUBLICATIONS

U.S. application No. 08/789,178, Fukushima, filed Jan. 24, 1997.

(List continued on next page.)

*Primary Examiner*—Georgia Y. Epps
*Assistant Examiner*—Dawn-Marie Bey
*Attorney, Agent, or Firm*—Staas & Halsey

[57] ABSTRACT

A Faraday rotator capable of maintaining a Faraday rotation angle always constant regardless of temperature variations. The Faraday rotator includes a magneto-optic crystal provided in a light propagation path, a permanent magnet for generating a magnetic field parallel to the light propagation path, and an electromagnet for generating a magnetic field orthogonal to the light propagation path. The strength of a synthetic magnetic field by the permanent magnet and the electromagnet is set to a magnitude large enough to magnetically saturate the magneto-optic crystal. The electromagnet is driven by a drive circuit. The Faraday rotator further includes a temperature sensor provided adjacent to the Faraday rotator, and a controller incorporating data on temperature dependence of a Faraday rotation angle of the magneto-optic crystal to control the drive circuit so that the Faraday rotation angle becomes constant according to a temperature detected by the temperature sensor.

11 Claims, 12 Drawing Sheets

FOREIGN PATENT DOCUMENTS

| | | |
|---|---|---|
| 60-200225 | 10/1985 | Japan . |
| 60-203914 | 10/1985 | Japan . |
| 60-165933 | 11/1985 | Japan . |
| 60-165934 | 11/1985 | Japan . |
| 60-222815 | 11/1985 | Japan . |
| 60-222818 | 11/1985 | Japan . |
| 61-97629 | 5/1986 | Japan . |
| 1-204021 | 8/1989 | Japan . |
| 2-83523 | 3/1990 | Japan . |
| 2-113019 | 9/1990 | Japan . |
| 6-51255 | 2/1994 | Japan . |

OTHER PUBLICATIONS

U.S. application No. 08/135,557, Fukushima, filed Oct. 14, 1993.

U.S. application No. 08/704,946, Shirasaki et al, filed Aug. 29, 1996.

U.S. application No. 08/804,517, Onaka, filed Feb. 21, 1997.

U.S. application No. 08/674,516, Fukushima, filed Jul. 2, 1996.

U.S. application No. 08/859,256, Fukushima, filed May 20, 1997.

Shirasaki et al., "Magnetooptical 2x2 switch for single–mode fibers," *Applied Optics*, vol. 23, No. 19, Oct. 1984, pp. 3271–3276.

Sugaya et al., "Novel configuration for low–noise and wide–dynamic–range Er–doped fiber amplifierfor WDM systems," *OAA '95*, Paper FC3, Jun. 16, 1995 (Davos, Switzerland), 4 pages.

N. Fukushima, H. Onaka, M. Shirasaki, Y. Suzuki, T. Tokumasu, "Non–Mechanical Variable Attenuator Module Using Faraday Effect," presented at the meeting Optical Amplifiers and Their Application, held on Jul. 11–13, 1996, in Monterey, California, sponsored and managed by Optical Society of America.

M. Shirasaki, et al., "Compact Optical Isolator for Fibers Using Birefringent Wedges"; Applied Optics, vol. 21, No. 23, pp. 4296–4299, (Dec. 1982).

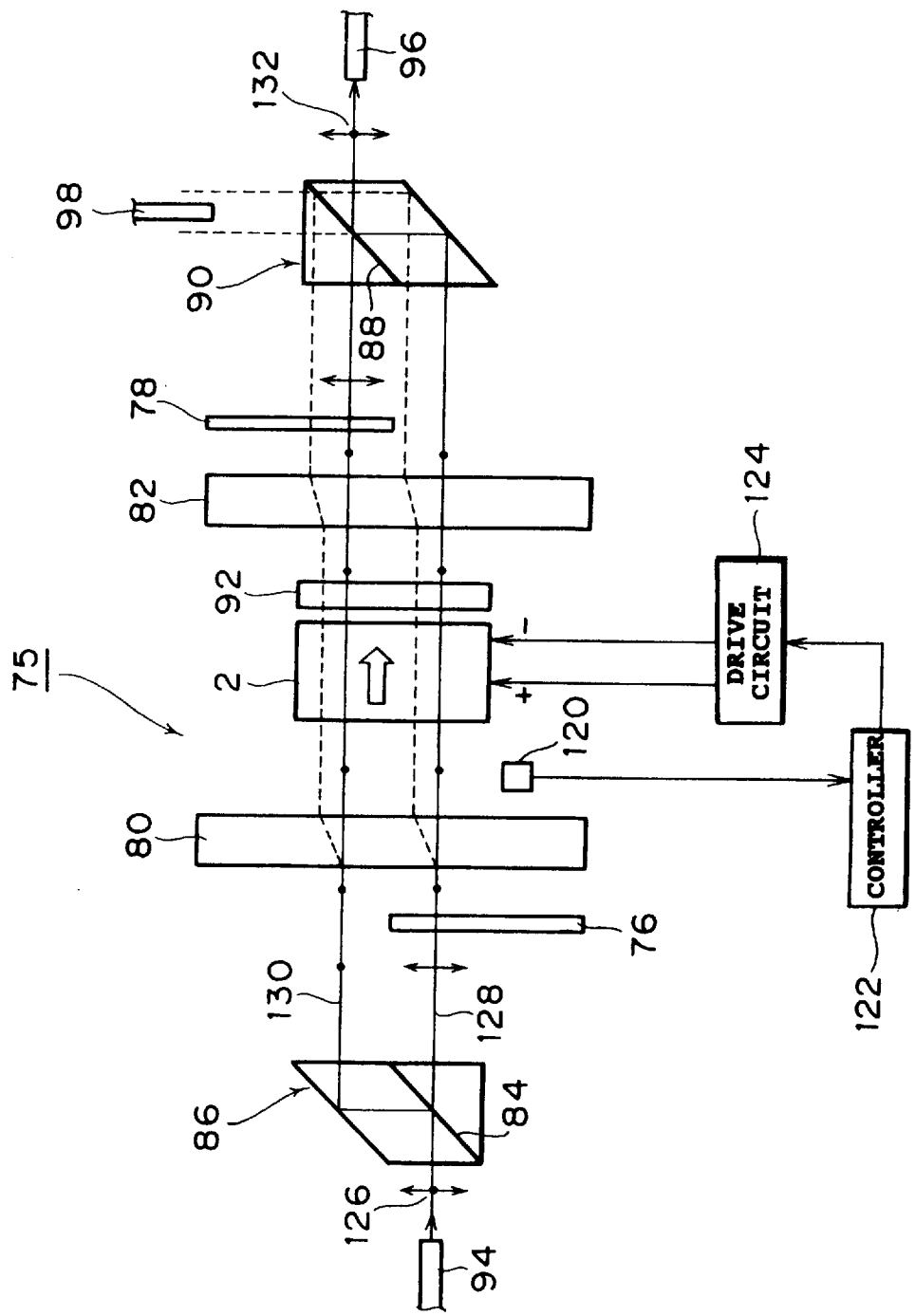

FARADAY ROTATOR AND OPTICAL DEVICE EMPLOYING THE SAME

BACKGROUND OF THE INVENTION

1. Field of the Invention

The present invention relates to a Faraday rotator and an optical device employing the same.

2. Description of the Related Art

A Faraday rotator is a device for controlling a polarized condition of light by using a Faraday effect such that when the light is passed through a magnetic field parallel to a traveling direction of the light, a polarization plane of the light is rotated. In general, the Faraday rotator is composed of a magneto-optic crystal having magnetization, and magnetic field applying means configured by a permanent magnet or an electromagnet, for example, for generating magnetization in the magneto-optic crystal. When light is passed through the magneto-optic crystal in which magnetization is generated, a polarization plane of the light is rotated. An angle of rotation of the polarization plane by the pass of light through the magneto-optic crystal is called a Faraday rotation angle.

The Faraday rotation angle of a Faraday rotator can be controlled by controlling a magnetic field to be applied by the magnetic field applying means to thereby change a magnetization component generated in the magneto-optic crystal parallel to a light traveling direction. Thus, the Faraday rotator is widely used as a polarization plane control element. By combining the Faraday rotator with a polarization conversion element such as a wave plate, a polarizer, and a polarization beam splitter, it is possible to realize various optical devices including an optical isolator, optical attenuator, optical switch, and optical circulator.

In the Faraday rotator, the Faraday rotation angle has temperature dependence. That is, when a target rotation angle is set at room temperature, there occurs a shift in rotation angle from the target rotation angle at high temperatures or low temperatures, causing degradation of the performance of the Faraday rotator. Conventionally proposed is a Faraday rotator that can control the Faraday rotation angle by using an electromagnet. However, the conventional Faraday rotator cannot control the Faraday rotation angle constant according to temperature variations. Further, in the conventional Faraday rotator, the Faraday rotation angle is controlled by a current. While voltage control is preferable in a usual electronic circuit, any voltage-controlled Faraday rotator has not yet been proposed.

SUMMARY OF THE INVENTION

It is therefore an object of the present invention to provide a Faraday rotator which can control a Faraday rotation angle constant regardless of temperature variations.

It is another object of the present invention to provide an optical device which can eliminate performance degradation due to variations in Faraday rotation angle over a wide temperature range, by controlling the Faraday rotation angle constant according to temperature changes.

In accordance with an aspect of the present invention, there is provided a Faraday rotator comprising a magneto-optic crystal provided in a light propagation path; magnetic field applying means for applying first and second magnetic fields having different directions to said magneto-optic crystal so that a strength of a synthetic magnetic field exceeds a predetermined value, said magnetic field applying means including an electromagnet for generating at least one of said first and second magnetic fields; driving means for driving said electromagnet; a temperature sensor provided adjacent to said Faraday rotator; and control means incorporating data on temperature dependence of a Faraday rotation angle of said magneto-optic crystal to control said driving means so that said Faraday rotation angle becomes constant according to a temperature detected by said temperature sensor.

Preferably, the magnetic field applying means further comprises a permanent magnet for generating the other of the first and second magnetic fields, and the first and second magnetic fields are applied in directions orthogonal to each other in a plane containing the light propagation path. Preferably, the temperature sensor comprises a thermistor capable of converting a temperature change into a current change.

In accordance with another aspect of the present invention, there is provided a Faraday rotator comprising a magneto-optic crystal provided in a light propagation path; a first permanent magnet located so that its magnetic field direction forms a first angle with respect to said light propagation path, said first permanent magnet having a first temperature coefficient of a field strength; and a second permanent magnet located so that its magnetic field direction forms a second angle larger than said first angle with respect to said light propagation path, said second permanent magnet having a second temperature coefficient of a field strength larger than said first temperature coefficient; wherein a Faraday rotation angle exhibited on the light passing through said magneto-optic crystal by a synthetic magnetic field generated by said first and second permanent magnets is controlled substantially constant regardless of temperature changes.

In accordance with a further aspect of the present invention, there is provided an optical device comprising a Faraday rotator comprising a magneto-optic crystal provided in a light propagation path, magnetic field applying means for applying first and second magnetic fields having different directions to said magneto-optic crystal so that a strength of a synthetic magnetic field exceeds a predetermined value, said magnetic field applying means including an electromagnet for generating at least one of said first and second magnetic fields, and driving means for driving said electromagnet; a temperature sensor provided adjacent to said Faraday rotator, said temperature sensor being capable of converting a temperature change into a current change; and control means incorporating data on temperature dependence of a Faraday rotation angle of said magneto-optic crystal to control said driving means so that said Faraday rotation angle becomes constant according to a temperature detected by said temperature sensor.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIGS. 8 and 9 are views showing a preferred embodiment of an optical switch;

DETAILED DESCRIPTION OF THE PREFERRED EMBODIMENTS

Figure 1:
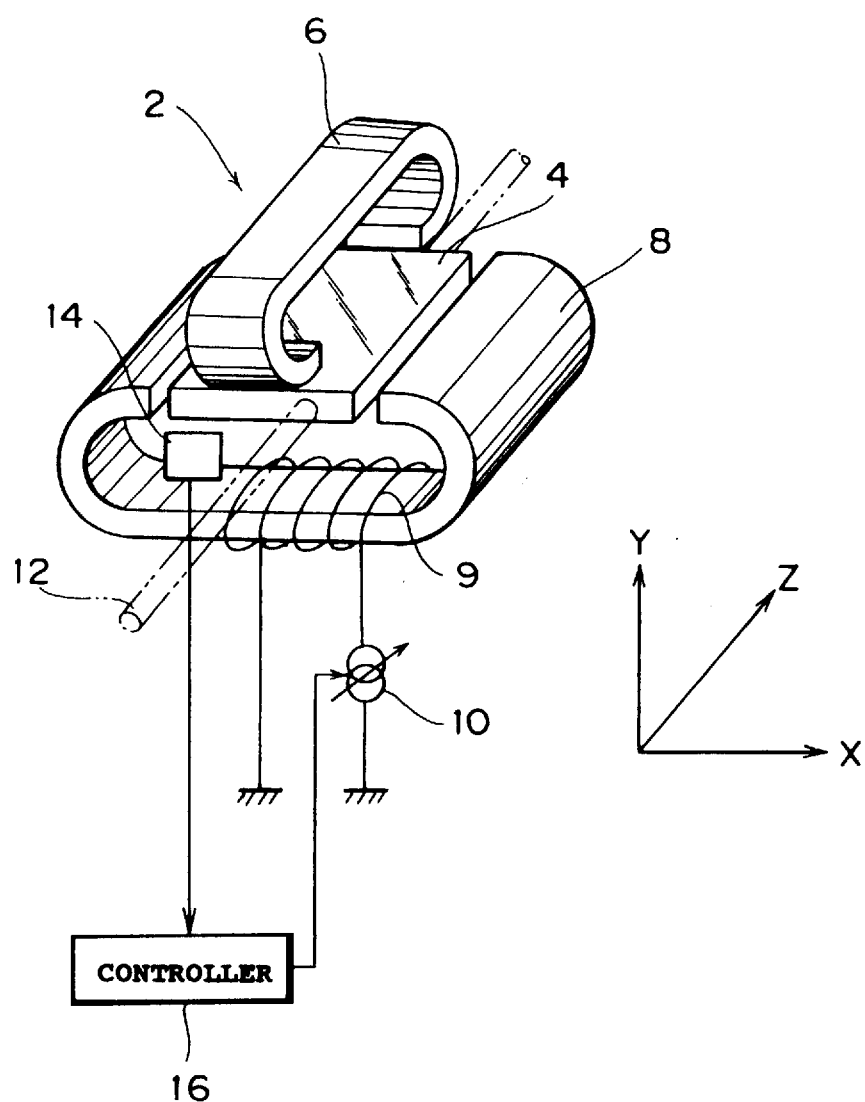
FIG. 1 is a perspective view of a Faraday rotator according to a first preferred embodiment of the present invention.

Referring to FIG. 1, there is shown a perspective view of a Faraday rotator 2 according to a first preferred embodiment of the present invention. The Faraday rotator 2 includes a magneto-optic crystal 4, and a permanent magnet 6 and an electromagnet 8 for applying magnetic fields in directions orthogonal to each other to the magneto-optic crystal 4. A coil 9 is wound around the electromagnet 8, and a drive current is supplied to the coil 9 by a variable current source 10.

A saturation magnetic field (a magnetic field strength saturating magnetization of a magneto-optic crystal or a magnetic field strength required to saturate a Faraday rotation angle) can be reduced by using the magneto-optic crystal 4 which has a relatively small thickness enough to transmit an optical beam. As the magneto-optic crystal 4, sliced YIG (yttrium-iron-garnet) or epitaxially grown $(GdBi)_3(FeAlGa)_5O_{12}$, for example, may be used.

The direction of the magnetic field to be applied to the magneto-optic crystal 4 by the permanent magnet 6 is parallel to a direction of transmission of an optical beam 12 in the magneto-optic crystal 4, and the direction of the magnetic field to be applied to the magneto-optic crystal 4 by the electromagnet 8 is perpendicular to the application direction of the magnetic field by the permanent magnet 6 and the transmission direction of the optical beam 12 in the magneto-optic crystal 4. The optical beam 12 incident on the magneto-optic crystal 4 is linearly polarized light, and its polarization direction is Faraday-rotated by the Faraday rotator 2. The Faraday rotation angle varies according to the purposes of use of the Faraday rotator 2. In the case of an optical isolator, the Faraday rotation angle is set to 45°.

The strength of a synthetic magnetic field by the permanent magnet 6 and the electromagnet 8 is so set as to be always larger than the saturation magnetic field in the magneto-optic crystal 4. This is due to the fact that if a magnetic field smaller than the saturation magnetic field in the magneto-optic crystal 4 is applied, many magnetic domains are generated in the magneto-optic crystal 4, causing inconvenience such as light scattering at an interface between the magnetic domains. In an XYZ orthogonal three-dimensional coordinate system to be used in the following description, the Z axis is parallel to a propagation direction of transmitted light in the magneto-optic crystal 4, and the Y axis is parallel to a thickness direction of the magneto-optic crystal 4. That is, in this preferred embodiment, the direction of the applied magnetic field by the permanent magnet 6 is parallel to the Z axis, and the direction of the applied magnetic field by the electromagnet 8 is parallel to the X axis.

Figure 2:
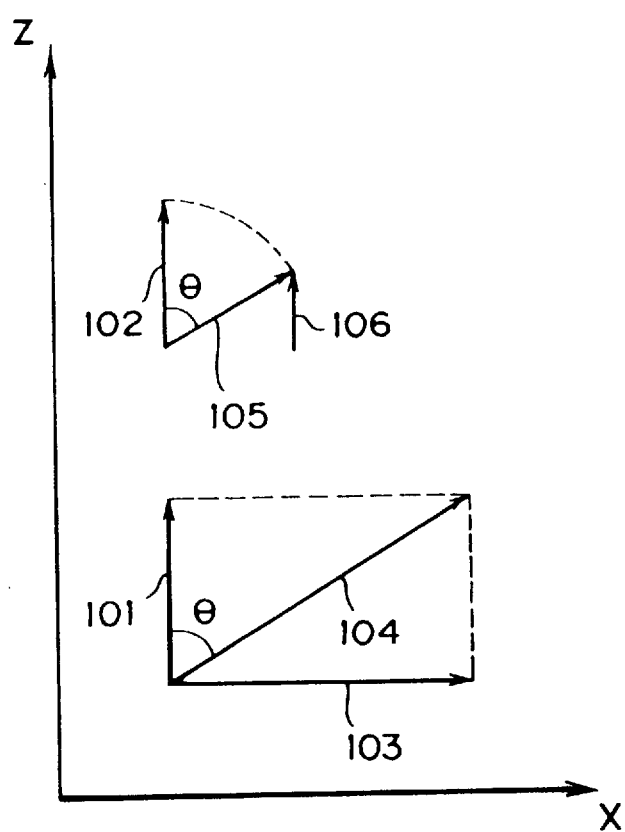
FIG. 2 is an illustration of a magnetic field and magnetization in FIG. 1.

FIG. 2 is a view for illustrating a magnetic field to be applied to the magneto-optic crystal 4 and a direction and strength (magnitude) of magnetization of the magneto-optic crystal 4 in the Faraday rotator 2 shown in FIG. 1. Assuming that a magnetic field is applied to the magneto-optic crystal 4 by the permanent magnet 6 only as shown by reference numeral 101, the magnetization of the magneto-optic crystal 4 is parallel to the Z axis as shown by reference numeral 102. The strength of the applied magnetic field in this case (the length of the magnetic field vector 101) is set so that the strength of the magnetization of the magneto-optic crystal 4 (the length of the magnetization vector 102) is saturated.

When a magnetic field by the electromagnet 8 is further applied in parallel to the X axis as shown by reference numeral 103, the synthetic magnetic field is obtained as a synthetic vector of the magnetic field vectors 101 and 103 as shown by reference numeral 104. The synthetic magnetic field 104 generates magnetization as shown by reference numeral 105 in the magneto-optic crystal 4. The magnetization vector 105 and the magnetic field vector 104 are parallel to each other, and the length of the magnetization vector 105 is equal to the length of the magnetization vector 102.

Although the strength of the magnetization in the magneto-optic crystal 4 is constant, the degrees of contribution to Faraday rotation in the magneto-optic crystal 4 are not always the same. The reason is that a Faraday rotation angle depends also on the relationship between the direction of the magnetization and the propagation direction of light. That is, in comparing a state where the magnetization 102 is generated and a state where the magnetization 105 is generated, a Z component 106 of the magnetization 105 is smaller than a Z component of the magnetization 102 (this Z component is the same as the magnetization 102 itself), so that a Faraday rotation angle by the magnetization 105 becomes smaller by a decrease in the Z component 106.

As mentioned above, a Faraday rotation angle has temperature dependence. Therefore, when the Faraday rotation angle is set to a given angle at room temperature, there occurs a shift from this given angle at a high temperature or a low temperature, thus causing a degradation in performance of the Faraday rotator. In the case that YIG, for example, is adopted as the magneto-optic crystal 4, the Faraday rotation angle decreases with an increase in temperature. In the Faraday rotator 2 according to this preferred embodiment, a current flowing in the coil 9 of the electromagnet 8 is controlled according to temperature variations, thereby obtaining an always constant Faraday rotation angle.

Figure 3:
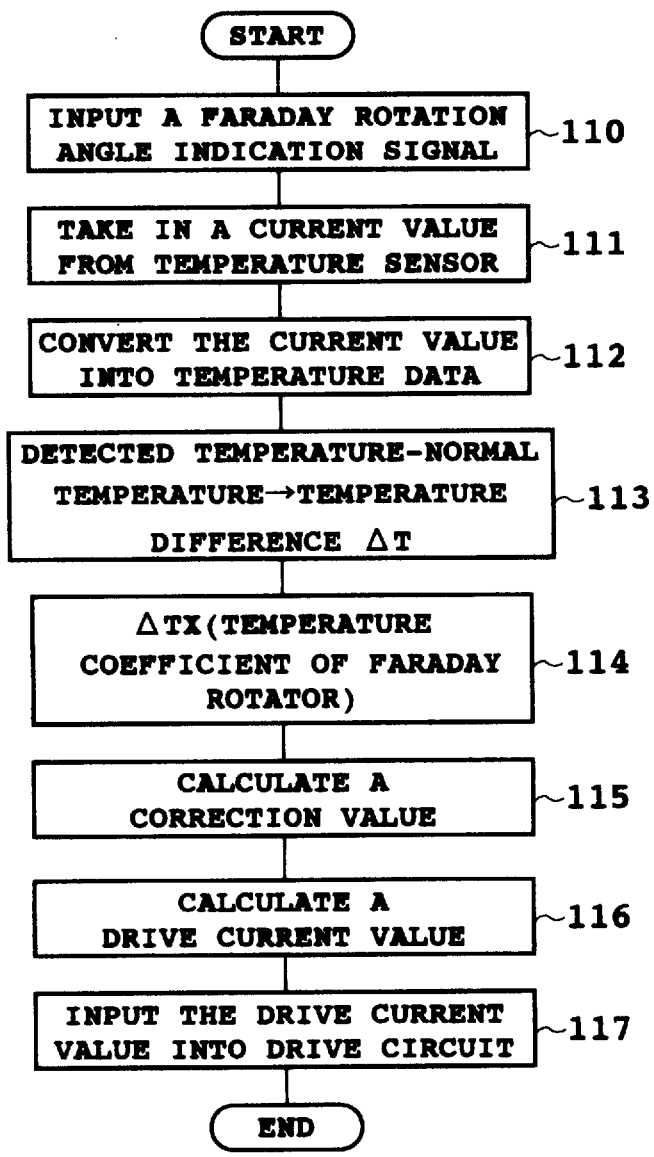
FIG. 3 is a control flowchart for the Faraday rotator.

Referring again to FIG. 1, reference numeral 14 denotes a temperature sensor such as a thermistor. Although not specifically shown, the temperature sensor 14 is mounted on the Faraday rotator 2 through a material having good heat conductivity. A temperature detected by the temperature sensor 14 is input into a controller 16. The controller 16 is configured from a microprocessor unit (MPU), for example. The controller 16 calculates a correction value according to a temperature change, and controls the variable current source 10 according to this correction value. The function of the controller 16 will now be described with reference to the flowchart shown in FIG. 3.

In step 110, a Faraday rotation angle indication signal is input into the controller 16. For example, in the case that the Faraday rotator 2 is used as an optical isolator, an indication signal indicating that a Faraday rotation angle of 45° is given is input. In step 111, a current value from the temperature sensor 14 is taken in, and in step 112, the current value is converted into temperature data. In step 113, a normal temperature (room temperature) is subtracted from a temperature detected by the temperature sensor 14 to obtain a temperature difference ΔT. In step 114, ΔT is multiplied by a temperature coefficient of the Faraday rotator to calculate a correction value (step 115).

The temperature coefficient of the Faraday rotator is determined by a material forming the magneto-optic crystal. For example, YIG has a temperature coefficient of −0.06°/° C. The temperature coefficient is preliminarily incorporated in the program. After calculating the correction value in step 115, the program proceeds to step 116, in which a drive current value is calculated. The relation between Faraday rotation angle and drive current is preliminarily stored as a table in the program. In step 117, the drive current value is input into a drive circuit (variable current source 10) to supply the drive current from the drive circuit to the coil 9 of the electromagnet 8.

Thus, the current flowing in the coil 9 of the electromagnet 8 is changed according to a temperature change detected by the temperature sensor 14, so that the Faraday rotator 2 according to this preferred embodiment can obtain a desired Faraday rotation angle that is always constant regardless of temperature variations. In the case of a 90° Faraday rotator, for example, the temperature coefficient of the Faraday rotator 2 is about 0.1°/° C. Therefore, when the temperature change is 20° C., the Faraday rotation angle changes by about 2°. In the case of a 45° Faraday rotator, the Faraday rotation angle changes about 1° with a temperature change of 20° C.

Figure 4:
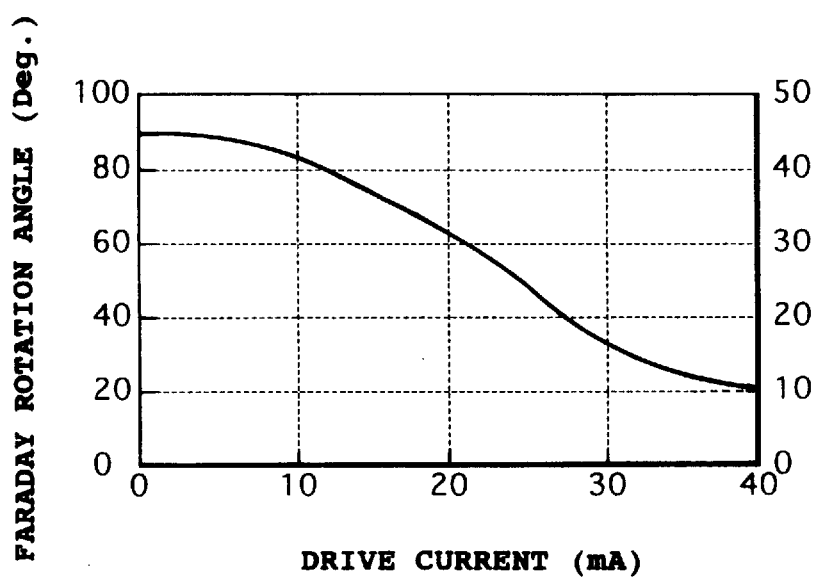
FIG. 4 is a graph showing the relation between drive current and Faraday rotation angle.

As apparent from the graph shown in FIG. 4, a drive current of about 36 mA is required to change a Faraday rotation angle by 60°. Accordingly, correction of a drive current of 0.6 mA is required to change a Faraday rotation angle by about 1°. This correction may be incorporated in the program. By correcting the Faraday rotation angle prior to the calculation of the drive current in step 116, the number of times of correction operations can be reduced to one.

Figure 5:
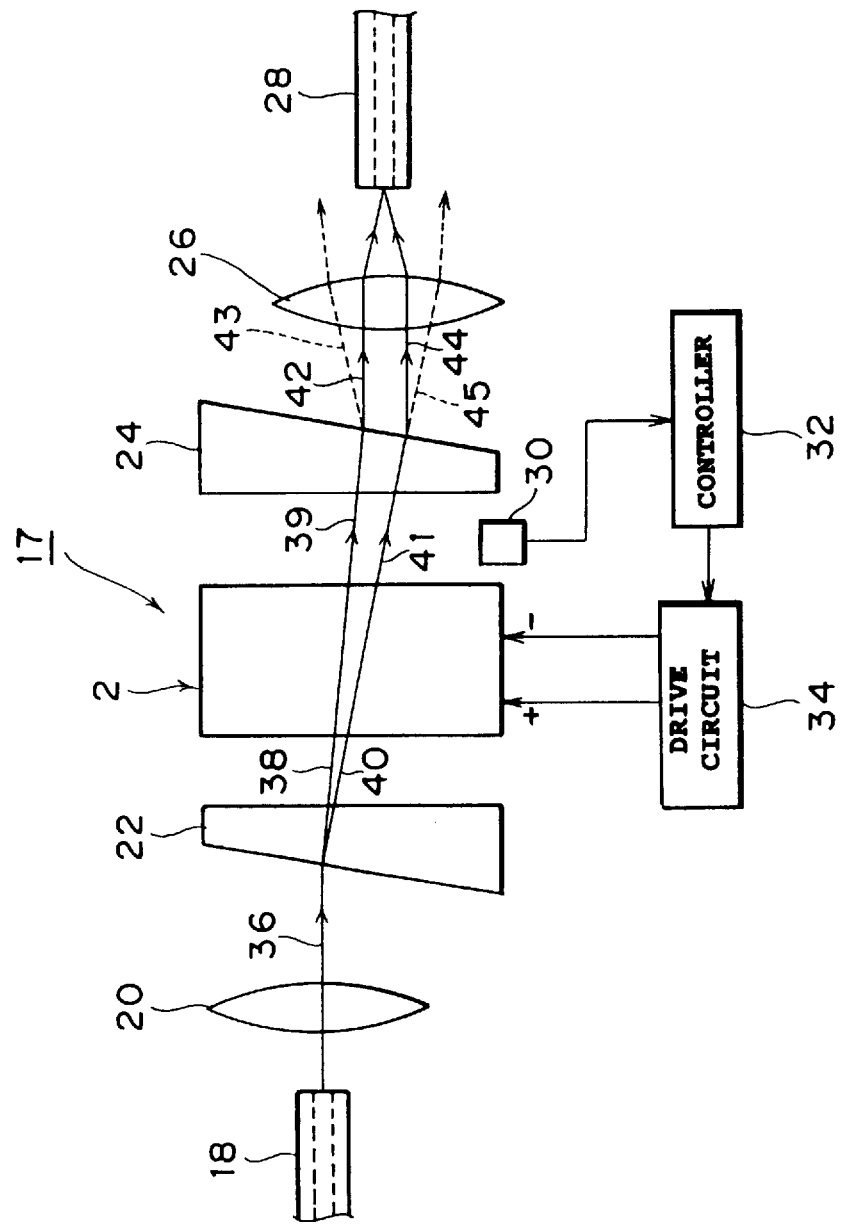
FIG. 5 is a view showing a preferred embodiment of an optical attenuator.

Referring to FIG. 5, there is shown a preferred embodiment of an optical attenuator 17 employing the Faraday rotator 2 mentioned above. The optical attenuator 17 is composed of an optical fiber 18, a lens 20, a tapering birefringent crystal 22, the Faraday rotator 2 shown in FIG. 1, a tapering birefringent crystal 24, a lens 26, and an optical fiber 28. These components are arranged in this order from the side of a light source not shown.

The birefringent crystals 22 and 24 are formed of rutile and have the same shape. The top and bottom portions of the birefringent crystal 22 are opposed to the bottom and top portions of the birefringent crystal 24, respectively, and the corresponding surfaces of the birefringent crystals 22 and 24 are parallel to each other. Further, optic axes of the birefringent crystals 22 and 24 are present in planes perpendicular to the sheet plane of FIG. 5, and the positional relation between the optic axes is determined by setting a loss at zero input to the attenuator. In the following description, it is assumed that the positional relation between the optic axes is determined so that the loss at zero input is minimized, and that the optic axis of the birefringent crystal 22 is parallel to the optic axis of the birefringent crystal 24.

Reference numeral 30 denotes a temperature sensor such as a thermistor. A temperature detected by the temperature sensor 30 is input into a controller 32. The controller 32 computes a change in drive current due to a temperature change to control a drive circuit 34. This control method is substantially similar to the control method for the Faraday rotator 2 mentioned above.

Light emerging from the optical fiber 18 is converted into a collimated beam by the lens 20. This collimated beam is shown by reference numeral 36 with its beam thickness neglected. The beam 36 is divided in the birefringent crystal 22 into a beam 38 corresponding to an ordinary ray of the beam 36 and a beam 40 corresponding to an extraordinary ray of the beam 36. The polarization direction of the beam 38 and the polarization direction of the beam 40 are orthogonal to each other. The polarization directions of the beams 38 and 40 are rotated by the same angle in the Faraday rotator 2 to respectively become beams 39 and 41. The beam 39 is divided in the birefringent crystal 24 into a beam 42 as an ordinary ray component of the beam 39 and a beam 43 as an extraordinary ray component of the beam 39. On the other hand, the beam 41 is divided in the birefringent crystal 24 into a beam 44 as an extraordinary ray component of the beam 41 and a beam 45 as an ordinary ray component of the beam 41.

In considering the history of refractions having applied to the beams 42 to 45 and the shape and position of the birefringent crystals 22 and 24, the beam 42 and the beam 44 are parallel to each other, and the beam 43 and the beam 45 are not parallel to each other. Accordingly, only the beams 42 and 44 of the beams 42 to 45 can be converged by the lens 26 to enter the optical fiber 28.

The ratio between a total power of the beams 42 and 44 and a total power of the beams 43 and 45 is dependent on the Faraday rotation angle in the Faraday rotator 2. By controlling the Faraday rotation angle in the Faraday rotator 2 according to a target attenuation value, the optical beam emerging from the optical fiber 18 can be attenuated with a desired attenuation factor to enter the optical fiber 28. The attenuation factor is controlled by adjusting a current flowing in the coil of the electromagnet of the Faraday rotator 2 through the drive circuit 34.

However, if temperature variations occur in the control of the attenuation factor, the Faraday rotation angle of the Faraday rotator 2 changes to cause a problem that the desired attenuation factor cannot be obtained. To cope with this problem, the optical attenuator according to this preferred embodiment employs the temperature sensor 30 to detect an ambient temperature of the Faraday rotator 2 and control a drive current flowing in the coil of the electromagnet according to the detected temperature by using a software preliminarily programmed.

Figure 6:
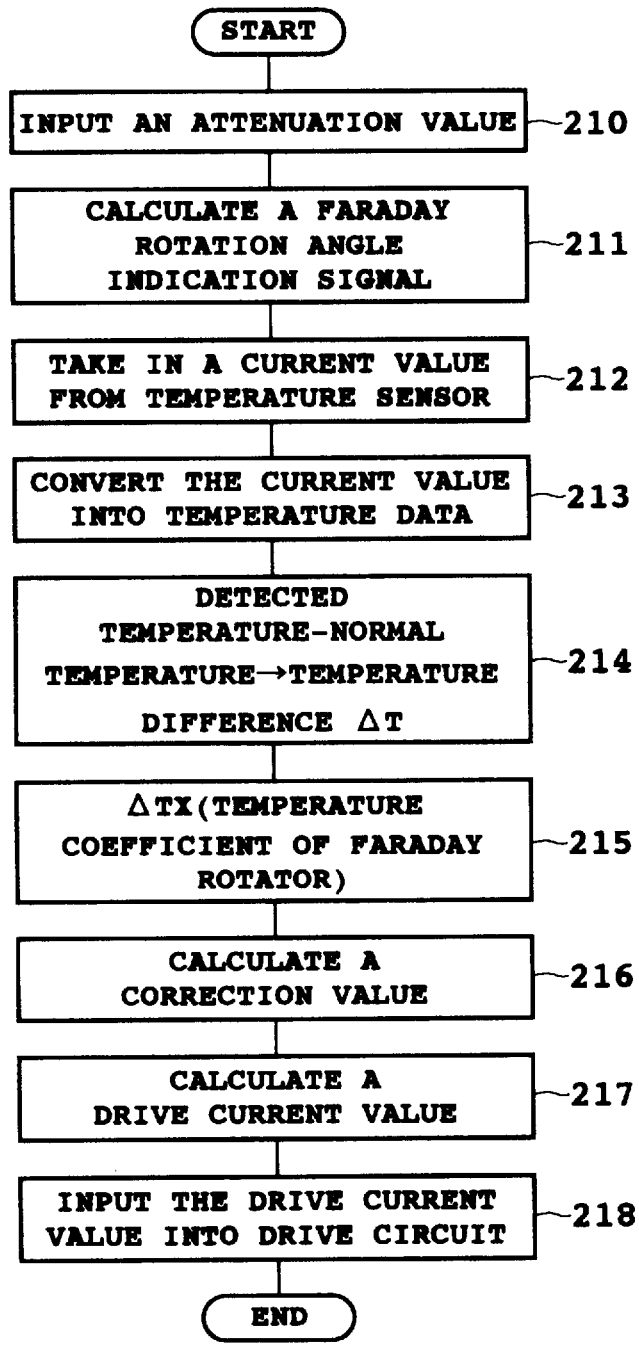
FIG. 6 is a control flowchart for the optical attenuator.

The control method for the Faraday rotation angle according to temperature variations will now be described with reference to FIG. 6. In step 210, a target attenuation value is input into the controller 32. Then, the controller 32 calculates a Faraday rotation angle indication signal in step 211. In step 212, the controller 32 takes in a current value detected by the temperature sensor 30 such as a thermistor. The steps 212 to 218 in this flowchart correspond to the steps 111 to 117 in the flowchart shown in FIG. 3, so the description thereof will be omitted herein. Thus, a drive current to be supplied to the electromagnet of the Faraday rotator 2 is adjusted according to temperature variations, thereby always obtaining a desired attenuation factor regardless of temperature variations.

Figure 7A:
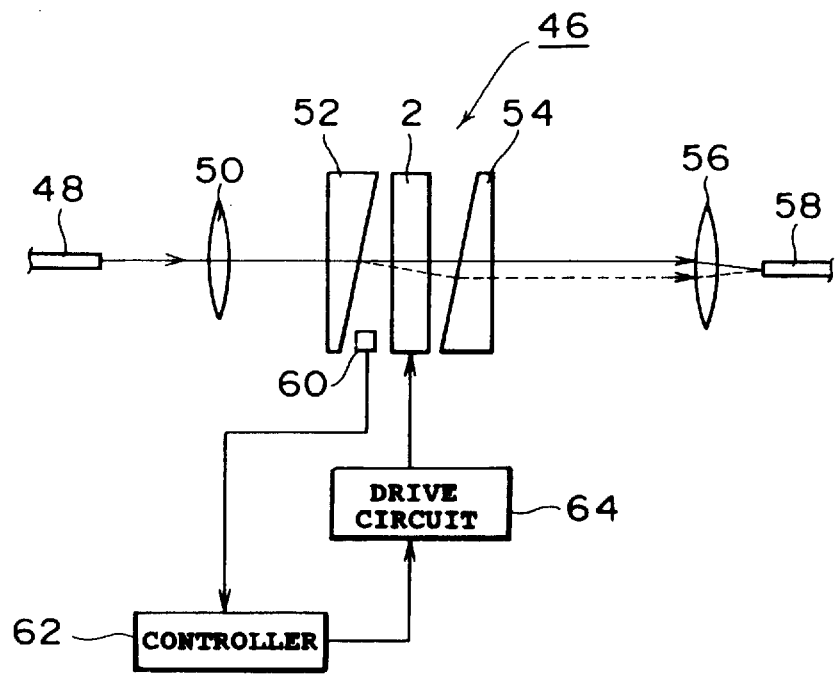
FIGS. 7A And 7B are views showing a preferred embodiment of an optical isolator.
Figure 7B:
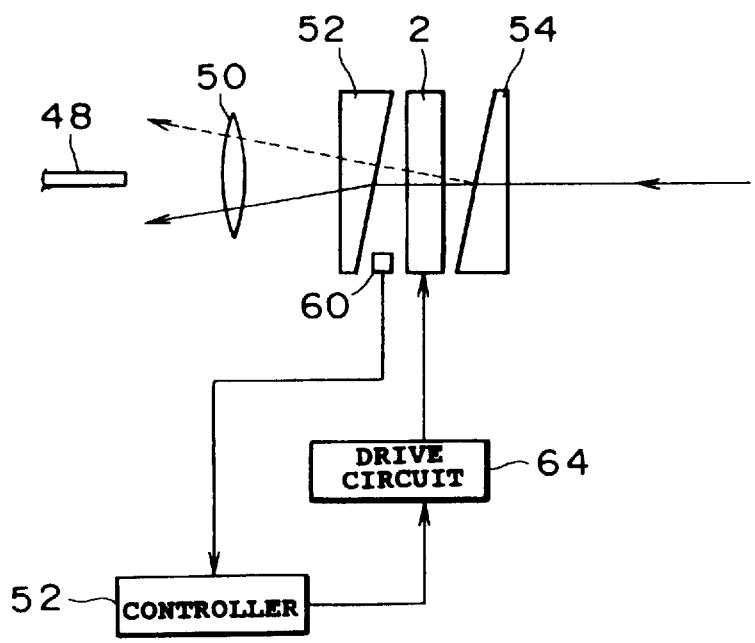

Referring to FIGS. 7A and 7B, there is shown a preferred embodiment of an optical isolator 46 employing the Faraday rotator 2. The configuration of this preferred embodiment is substantially the same as the configuration of the optical attenuator shown in FIG. 5. However, the Faraday rotation angle of the Faraday rotator 2 is set to 45, so that a range of adjustment of a drive current by a drive circuit 64 may be reduced. As shown in FIG. 7A, the optical isolator 46 includes an optical fiber 48 located upstream of a propagation direction of forward light, a lens 50 for converting the light emerging from the optical fiber 48 into a collimated beam, a polarizer 52 formed from a wedged birefringent crystal, a Faraday rotator 2 having a rotation angle set to 45°, a polarizer 54 formed from a wedged birefringent crystal, a lens 56, and an optical fiber 58. These components are arranged in this order along the light traveling direction.

The polarizers 52 and 54 are positioned so that the top and bottom portions of the polarizer 52 are opposed to the bottom and top portions of the polarizer 54, respectively, and that the corresponding surfaces of the polarizers 52 and 54 are parallel to each other. While the positional relation between the polarizers 52 and 54 is opposite to the positional relation between the birefringent crystals 22 and 24 of the optical attenuator shown in FIG. 5, the same positional relation as that shown in FIG. 5 may be adopted. The optic axis of the polarizer 54 is pointed at an angle of 45° with respect to the optic axis of the polarizer 52 in the same rotational direction as that of Faraday rotation in the Faraday rotator 2. When the forward light emerging from the optical fiber 48 is passed through the lens 50, the polarizer 52, the Faraday rotator 2, and the polarizer 54 in this order and then focused by the lens 56, the focus is formed inside a core end face of the optical fiber 58. Further, when backward light emerging from the optical fiber 58 is passed through the lens 56, the polarizer 54, the Faraday rotator 2, and the polarizer 52 in this order and then focused by the lens 50, the focus is formed outside a core end face of the optical fiber 48.

When the beam emerging from the optical fiber 48 and collimated by the lens 50 enters the polarizer 52 in the forward direction, the incident light on the polarizer 52 is divided into an ordinary ray and an extraordinary ray to be refracted in different directions to enter the Faraday rotator 2, because of different refractive indices in the polarizer 52 according to polarized light components. Since the optic axis of the polarizer 54 is pointed at an angle of 45° with respect to the optic axis of the polarizer 52 in the same rotational direction as that of Faraday rotation in the Faraday rotator 2, the polarization planes of the ordinary ray and the extraordinary ray in the polarizer 52 are rotated 45° for each in the Faraday rotator 2, and respectively become an ordinary ray and an extraordinary ray also in the polarizer 54. Accordingly, the ordinary ray and the extraordinary ray passed through the polarizer 54 exit in parallel to each other. A collimated beam of the ordinary ray and the extraordinary ray outgoing from the polarizer 54 is focused by the lens 56 to enter the optical fiber 58.

As shown in FIG. 7B, feedback light reflected on an end face of an optical connector or the like (not shown) enters the polarizer 54, in which the incident light is divided into an ordinary ray and an extraordinary ray to be refracted in different directions to enter the Faraday rotator 2, in which the polarization plane of the incident light is rotated 45°, then exiting from the Faraday rotator 2. The ordinary ray in the polarizer 54 whose polarization plane has been rotated 45° undergoes refraction as an extraordinary ray in the polarizer 52. Further, the extraordinary ray in the polarizer 54 whose polarization plane has been rotated 45° undergoes refraction as an extraordinary ray in the polarizer 52. Accordingly, the traveling direction of backward light emerging from the polarizer 52 is different from the traveling direction of forward light. As a result, the backward light passed through the lens 50 is not coupled to the optical fiber 48.

As mentioned above, the Faraday rotation angle of the Faraday rotator 2 varies with temperature. Therefore, although the Faraday rotation angle of the Faraday rotator 2 is set to 45° at room temperature, the rotation angle changes with temperature variations, so that an optical isolator having a sufficient extinction ratio cannot be realized. To cope with this problem, the optical isolator 46 according to this preferred embodiment employs a temperature sensor 60 to detect an ambient temperature of the Faraday rotator 2 and input the detected temperature into a controller 62. As similar to the previous preferred embodiment, the controller 62 calculates a correction value of a drive current according to the detected temperature, and controls the drive circuit 64 according to the correction value to adjust the drive current flowing in the coil of the electromagnet so that the Faraday rotation angle always becomes 45° regardless of temperature changes.

Figure 9:
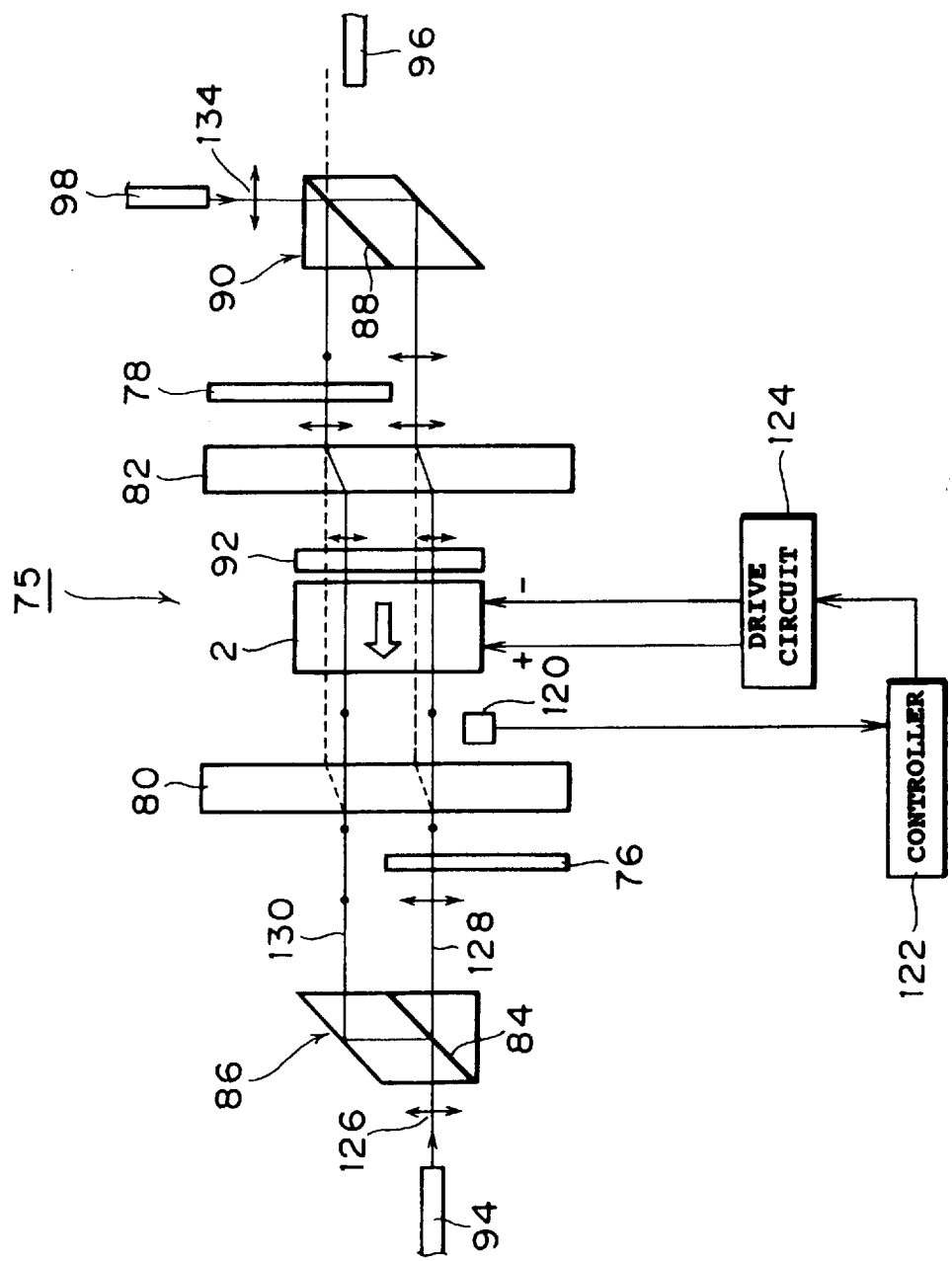

Referring to FIGS. 8 and 9, there is shown a preferred embodiment of an optical switch 75 employing the Faraday rotator 2. As shown in FIG. 8, the optical switch 75 includes half-wave plates 76 and 78 formed from quartz, and flat birefringent plates 80 and 82 formed from calcite or rutile. The birefringent plate 80 is inserted between a polarizing prism 80 having a beam splitting film 84 and the Faraday rotator 2. The half-wave plate 76 is inserted between the polarizing prism 86 and the birefringent plate 80 so as to be opposed to a lower portion of the birefringent plate 80.

The birefringent plate 82 is inserted between the Faraday rotator 2 and a polarizing prism 90 having a beam splitting film 88. The half-wave plate 78 is inserted between the polarizing prism 90 and the birefringent plate 82 so as to be opposed to an upper portion of the birefringent plate 82. In the case that the direction of application of a magnetic field in the Faraday rotator 2 is the same as the light traveling direction, the Faraday rotator 2 rotates a polarization plane by 45° in a clockwise direction, whereas in the case that the field application direction is opposite to the light traveling direction, the Faraday rotator 2 rotates a polarization plane by 45° in a counterclockwise direction. Further, a half-wave plate 92 rotates a polarization plane by 45° always in a counterclockwise direction.

When an optical beam 126 emerging from an optical fiber 94 enters the polarizing prism 86 in the condition that a magnetic field is applied to the Faraday rotator 2 in a direction shown by an arrow in FIG. 8, the optical beam 126 is divided into P-polarized light 128 and S-polarized light 130 by the polarizing prism 86. The P-polarized light 128 is passed through the half-wave plate 76. At this time, the polarization plane of the P-polarized light 128 is rotated 90° to become S-polarized light, which is next passed through the birefringent plates 80 and 82. At this time, a crosstalk component due to the beam splitting film 84 is refracted to exhibit a translational shift as shown by a broken line.

On the other hand, the S-polarized light 130 is passed through the birefringent plates 80 and 82. At this time, a crosstalk component due to the beam splitting film 84 is refracted to exhibit a translational shift as shown by a broken line. The S-polarized light 130 is passed through the half-wave plate 78. At this time, the polarization plane of the S-polarized light 130 is rotated 90° to become P-polarized light. The P-polarized light is transmitted by the beam splitting film 88, and the S-polarized light is reflected by the beam splitting film 88. Therefore, almost all the light is combined as an optical beam 132, which is next coupled to an optical fiber 96.

The crosstalk components upward emerging from the polarizing prism 90 as shown by broken lines have exhibited the translational shift as mentioned above. Therefore, the crosstalk components are not coupled to an optical fiber 98. In the case that the field application direction in the Faraday rotator 2 is the same as the direction of the arrow as shown in FIG. 8, the optical rotation direction of the Faraday rotator 2 and the optical rotation direction of the half-wave plate 92 are opposite to each other, so that optical rotations of the Faraday rotator 2 and the half-wave plate 92 are canceled each other. Accordingly, after the optical beams are passed through the Faraday rotator 2 and the half-wave plate 92, there is no effect on the polarization plane of each optical beam.

FIG. 9 shows the case where the field application direction in the Faraday rotator 2 is opposite to that shown in FIG. 8. When the optical beam 126 from the optical fiber 94 enters the polarizing prism 86 in this case, the P-polarized light 128 and the S-polarized light 130 divided by the polarizing prism 86 are passed through the birefringent plate 80 in a manner similar to that shown in FIG. 8. However, when the P-polarized light 128 and the S-polarized light 130 are passed through the Faraday rotator 2 and the half-wave plate 92, the polarization planes of the P-polarized light 128 and the S-polarized light 130 are rotated 90° for each.

Accordingly, after passing the half-wave plate 92, the P-polarized light 128 remains P-polarized light, but the S-polarized light 130 becomes P-polarized light. The light outgoing from the half-wave plate 92 is refracted in the birefringent plate 82, and its optical paths come to coincidence with the crosstalk components shown by broken lines in FIG. 9. Thereafter, the P-polarized light based on the S-polarized light 130 is passed through the half-wave plate 78. At this time, the polarization plane of the P-polarized light is rotated 90° to become S-polarized light, which is next reflected by the beam splitting film 88 of the polarizing prism 90. On the other hand, the P-polarized light based on the P-polarized light 128 is not passed through the half-wave plate 78 and then transmitted by the beam splitting film 88. Thus, the two beams of P-polarized light are combined to become a synthetic beam 134, which is next coupled to the optical fiber 98. The crosstalk component shown by the broken line exiting rightward from the polarizing prism 90 has exhibited a translational shift, so that it is not coupled to the optical fiber 96.

As described above, although the beam splitting films 84 and 88 have large crosstalk, the crosstalk components are not coupled to the optical fibers 96 and 98, thereby allowing a reduction in crosstalk of the optical switch. However, the rotation angle of the Faraday rotator 2 changes with temperature variations as mentioned above. Accordingly, when temperature changes, there is generated a crosstalk component due to a change in the Faraday rotation angle.

To cope with this problem, the optical switch 75 according to this preferred embodiment employs a temperature sensor 120 to detect an ambient temperature of the Faraday rotator 2 and input the detected temperature into a controller 122. The controller 122 computes a correction value according to the detected temperature and calculates a drive current according to the correction value. The drive current thus calculated is supplied from the controller 122 through a drive circuit 124 to the coil in the Faraday rotator 2, thereby obtaining an always constant Faraday rotation angle regardless of temperature variations. Accordingly, the crosstalk due to variations in the Faraday rotation angle can be reduced.

Figure 10:
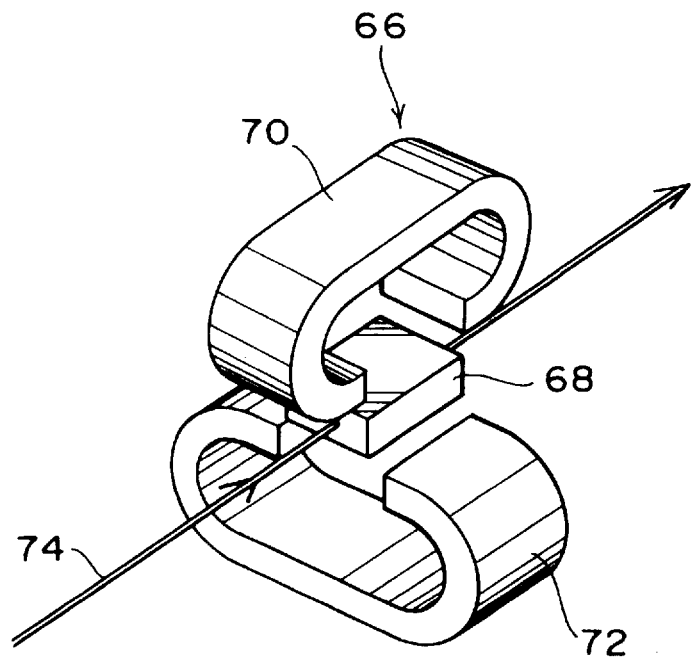
FIG. 10 is a perspective view of a Faraday rotator according to a second preferred embodiment of the present invention.

Referring to FIG. 10, there is shown a Faraday rotator 66 according to a second preferred embodiment of the present invention. The Faraday rotator 66 is composed of a magneto-optic crystal 68 of YIG, for example, a first permanent magnet 70 located so that the direction of a magnetic field generating therefrom forms a first angle with respect to a propagation path of an optical beam 74, and a second permanent magnet 72 located so that the direction of a magnetic field generating therefrom forms a second angle larger than the first angle with respect to the propagation path of the optical beam 74.

In this preferred embodiment, the first permanent magnet 70 is located so that its magnetic field direction is parallel to the propagation direction of the optical beam 74, and the second permanent magnet 72 is located so that its magnetic field direction is orthogonal to the magnetic field direction of the first permanent magnet 70. In the Faraday rotator 66 according to this preferred embodiment, a synthetic magnetic field by the two permanent magnets 70 and 72 is applied to the magneto-optic crystal 68, and the Faraday rotation angle varies according to an angle formed between the direction of the synthetic magnetic field and the propagation direction of the optical beam 74. In general, the magnetic field of a permanent magnet varies with temperature.

Since the Faraday rotator 66 according to this preferred embodiment employs the two permanent magnets 70 and 72, the factors of change of the Faraday rotation angle are a change in the direction of the synthetic magnetic field by the permanent magnets 70 and 72 and a physical property of the magneto-optic crystal changing with temperature variations. Of the two factors, the physical property cannot usually be adjusted. However, the change in the direction of the synthetic magnetic field can be adjusted by the way of combination of the two permanent magnets 70 and 72 or by the material and structure of a yoke for guiding the magnetic fields generated by the permanent magnets 70 and 72. For example, the magnetic force of a permanent magnet generally decreases with an increase in temperature in many cases, and the temperature coefficient of a field strength is determined by the composition of the magnet.

Further, the Faraday rotation angle of a magneto-optic crystal decreases with an increase in temperature in many cases, and the temperature coefficient of a Faraday rotation angle differs according to the physical property of a magneto-optic crystal. Since the range of choices of a practical magneto-optic crystal is narrow, it is almost impossible to attain a desired temperature coefficient of a Faraday rotation angle solely by a magneto-optic crystal. However, by using the permanent magnets 70 and 72 having different characteristics, a desired temperature coefficient of a Faraday rotation angle can be attained.

In the Faraday rotator 66 shown in FIG. 10, the first permanent magnet 70 is formed of a material having a negligibly small temperature coefficient of a field strength. For example, the first permanent magnet 70 is formed of a Sm-Co material. The second permanent magnet 72 is formed of a material having a large temperature coefficient of a field strength, that is, the field strength lowers at high temperatures. For example, the second permanent magnet 72 is formed of a NdFeB material.

On the other hand, the Faraday rotation angle of the magneto-optic crystal 68 generally becomes small at high temperatures. In YIG, for example, the Faraday rotation angle decreases by about 0.06° per 1° C. increase in temperature. The Faraday rotation angle of the Faraday rotator 66 according to this preferred embodiment can be maintained substantially constant regardless of temperature variations.

Figure 11:
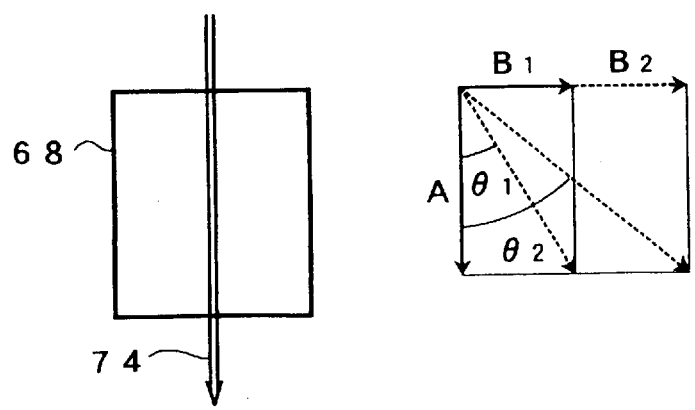
FIG. 11 is a view showing the relation between temperature change and synthetic magnetic field.

The operation of the Faraday rotator 66 according to this preferred embodiment will now be described with reference to FIG. 11. The field strength of the first permanent magnet 70 is denoted by A, which is substantially constant regardless of temperature variations. The field direction of the first permanent magnet 70 is parallel to the propagation direction of the optical beam 74. On the other hand, the field strength of the second permanent magnet 72 at an ordinary temperature is denoted by $B_2$, and an angle formed between the direction of the synthetic magnetic field and the field direction of the first permanent magnet 70 is denoted by θ2. Letting θF denote a Faraday rotation angle if the field direction coincides with the light traveling direction, the Faraday rotation angle corresponding to the angle θ2 becomes θFcosθ2.

When the temperature rises, the field strength of the second permanent magnet 72 decreases to $B_1$. Accordingly, the angle between the direction of the synthetic magnetic field and the field direction of the first permanent magnet 70 becomes θ1 smaller than θ2. In this case, the Faraday rotation angle becomes θFcosθ1, which is larger than θFcosθ2, provided that θF is constant. However, since the Faraday rotation angle of the magneto-optic crystal 68 decreases with an increase in temperature, θF decreases with an increase in temperature. That is, the effect of the direction of the synthetic magnetic field by the two permanent magnets 70 and 72 on the Faraday rotation and the effect of the temperature coefficient of the magneto-optic crystal 68 are counteracted.

Accordingly, by adopting permanent magnets giving proper values of θ1 and θ2, the effect of temperature variations on the Faraday rotation of the magneto-optic crystal 68 can be canceled by the effect of a change in the direction of the synthetic magnetic field by the two permanent magnets 70 and 72 on the Faraday rotation. By locating a yoke of a soft magnetic member between the permanent magnets 70 and 72 and the magneto-optic crystal 68, and suitably selecting the material of the soft magnetic member, the temperature coefficient of a Faraday rotation angle can be adjusted. By suitably selecting the materials of the magneto-optic crystal 68 and the permanent magnets 70 and 72, the temperature coefficient of a Faraday rotation angle can be set to a desired magnitude, so that the Faraday rotator in this case can be applied to an optical device in which the Faraday rotation angle is required to be changed according to temperature.

Figure 12:
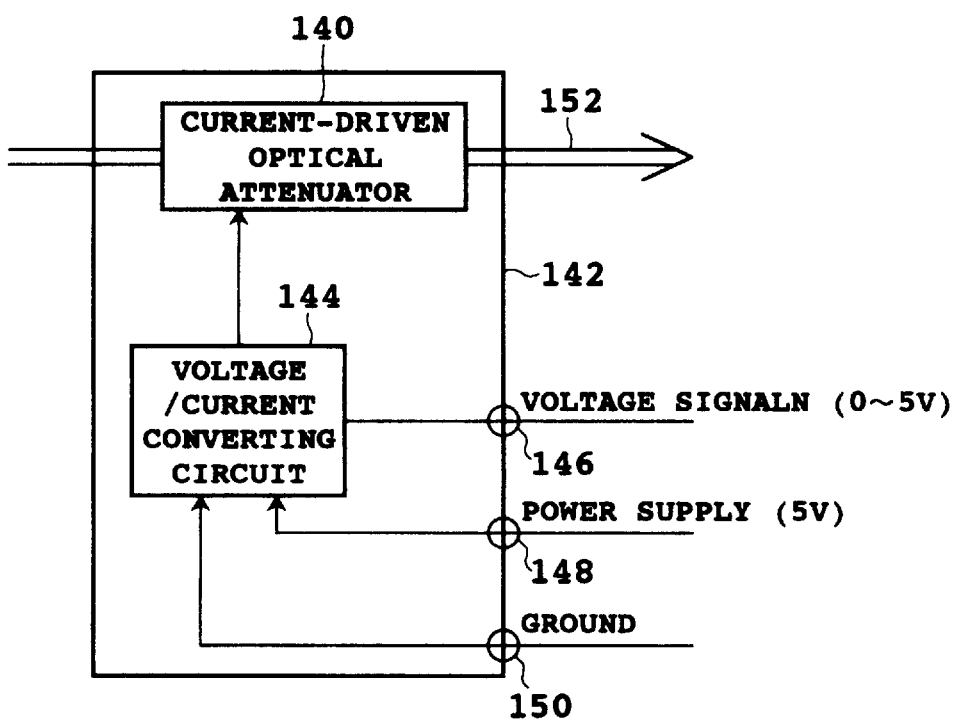
FIG. 12 is a block diagram showing a second preferred embodiment of the optical attenuator.

Referring to FIG. 12, there is shown a block diagram of a second preferred embodiment of the optical attenuator according to the present invention. A voltage-current converting circuit 144 is provided in a housing 142 of a current-driven optical attenuator 140. The optical attenuator 140 is driven by the voltage-current converting circuit 144. While an optical attenuator is used for adjustment of a light quantity in an optical amplifier or the like, a control signal for the adjustment is a voltage signal in many cases. Therefore, the optical attenuator 140 is preferably controlled by a voltage signal. The housing 142 is provided with a control signal input terminal 146, a power terminal 148, and a ground terminal 150. Reference numeral 152 denotes an optical beam.

Figure 13:
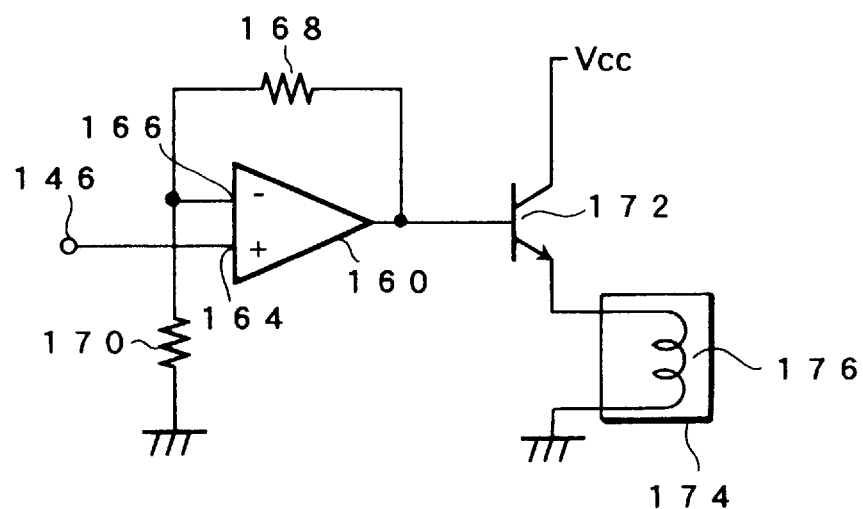
FIG. 13 is a diagram of a voltage-current converting circuit.

A preferred embodiment of the voltage-current converting circuit 144 will now be described with reference to FIG. 13.

The control signal input terminal 146 is connected to a positive-phase input terminal 164 of an operational amplifier 160. A resistor 168 is inserted between a negative-phase input terminal 166 of the operational amplifier 160 and an output terminal of the operational amplifier 160. The negative-phase input terminal 166 of the operational amplifier 160 is pulled-down through a resistor 170 to a ground potential. An output from the operational amplifier 160 is supplied through the base of a transistor 172, and a drive current to be supplied to a coil 176 of an electromagnet 174 of a Faraday rotator is controlled according to the magnitude of a base voltage.

Having thus described specific embodiments applying the Faraday rotator 2 shown in FIG. 1 to an optical attenuator, optical isolator, and optical switch, it is to be noted that applications of the present invention are not limited to the above, but the present invention is applicable similarly to any other optical devices such as an optical circulator and a polarization controller using the Faraday rotator.

According to the present invention, it is possible to provide a Faraday rotator which can control a Faraday rotation angle always constant regardless of temperature variations. Accordingly, the performance of an optical device using the Faraday rotator can be improved.

What is claimed is:

1. A Faraday rotator comprising:

a magneto-optic crystal provided in a light propagation path;

magnetic field applying means for applying first and second magnetic fields having different directions to said magneto-optic crystal so that a strength of a synthetic magnetic field exceeds a predetermined value, said magnetic field applying means including an electromagnet for generating at least one of said first and second magnetic fields;

driving means for driving said electromagnet;

a temperature sensor provided adjacent to said Faraday rotator; and control means for controlling said driving means so that a Faraday rotation angle becomes constant according to a temperature detected by said temperature sensor, said control means incorporating data on temperature dependence of the Faraday rotation angle of said magneto-optic crystal.

2. A Faraday rotator according to claim 1, wherein said magnetic field applying means further comprises a permanent magnet for generating the other of said first and second magnetic fields.

3. A Faraday rotator according to claim 2, wherein said first and second magnetic fields are applied in directions orthogonal to each other in a plane containing said light propagation path.

4. A Faraday rotator according to claim 3, wherein the magnetic field by said permanent magnet is applied in a direction parallel to said light propagation path.

5. A Faraday rotator according to claim 1, wherein said temperature sensor comprises a thermistor capable of converting a temperature change into a current change.

6. A Faraday rotator comprising:

a magneto-optic crystal provided in a light propagation path;

a first permanent magnet located so that its magnetic field direction forms a first angle with respect to said light propagation path, said first permanent magnet having a first temperature coefficient of a field strength; and a second permanent magnet located so that its magnetic field direction forms a second angle larger than said first angle with respect to said light propagation path, said second permanent magnet having a second temperature coefficient of a field strength larger than said first temperature coefficient;

wherein a Faraday rotation angle exhibited on the light passing through said magneto-optic crystal by a synthetic magnetic field generated by said first and second permanent magnets is controlled substantially constant regardless of temperature changes.

7. A Faraday rotator according to claim 6, wherein said first angle is 0°, and said first permanent magnet is located in parallel to said light propagation path.

8. A Faraday rotator according to claim 7, wherein said first and second permanent magnets are located so as to be substantially orthogonal to each other.

9. An optical device comprising:

a Faraday rotator comprising a magneto-optic crystal provided in a light propagation path, magnetic field applying means for applying first and second magnetic fields having different directions to said magneto-optic crystal so that a strength of a synthetic magnetic field exceeds a predetermined value, said magnetic field applying means including an electromagnet for generating at least one of said first and second magnetic fields, and driving means for driving said electromagnet;

a temperature sensor provided adjacent to said Faraday rotator, said temperature sensor being capable of converting a temperature change into a current change; and control means for controlling said driving means so that a Faraday rotation angle becomes constant according to a temperature detected by said temperature sensor, said control means incorporating data on temperature dependence of the Faraday rotation angle of said magneto-optic crystal.

10. An optical device according to claim 9, wherein said optical device is any one of an optical isolator, optical attenuator, optical switch, optical circulator, and polarization controller.

11. An optical device according to claim 9, wherein said magnetic field applying means further comprises a permanent magnet for generating the other of said first and second magnetic fields, and a field direction of said permanent magnet is parallel to said light propagation path.

* * * * *